Oct. 23, 1928.

F. SCHLAYER 1,688,662

THRASHING MACHINE

Filed March 26, 1925 2 Sheets-Sheet 1

Inventor:
F. Schlayer
By Marks & Clerk
Attys

Oct. 23, 1928.
F. SCHLAYER
1,688,662
THRASHING MACHINE
Filed March 26, 1925
2 Sheets-Sheet 2

Inventor:
Felix Schlayer
By Chas H Keel
attorney

Patented Oct. 23, 1928.

1,688,662

UNITED STATES PATENT OFFICE.

FELIX SCHLAYER, OF MADRID, SPAIN.

THRASHING MACHINE.

Application filed March 26, 1925, Serial No. 18,587, and in Germany April 8, 1924.

My invention relates to axial thrashing and/or straw-reducing machines, as for example machines of the class described and claimed in my earlier pending application Serial No. 662,577, filed September 13, 1923.

The aim and object of the present invention is so to perfect the effective operation of the draft created by the working members of this axial machine that the thrashing materials will be forcibly drawn in at the intake end, rapidly driven through the machine during the treatment proper, incidentally well stripped of the grains, and finally blown away a certain distance. In contradistinction to well known axial machines of the kind, in which special fans or blowers are provided for creating the draft necessary to feed on the thrashing materials, the present invention contemplates the methodical production and utilization of the auto-draft, which is created incidentally as a result of the rotation of the working members.

An important feature of the invention resides in forming the intake end of the machine into a special combined material feeding and draft producing part as for example by providing in advance of the intake, speaking in the sense of rotation of the machine shaft, a projection restricting the annular space between the revolving beaters and the drum wall, and propelling the air drawn in by suction from the feeding chute by the revolution of the working members, towards the discharge end of the machine.

The provision of this projection will cause the air drawn in by the revolving working members, from the feeding chute, to be driven completely towards the discharge end of the machine, so that it will flow through the machine proper, i. e. the part serving for the treatment, as a strong current rapidly carrying along the material to be thrashed; and upon leaving the machine this current of air can still be used to perform other functions. The complete driving off of the drawn-in air will enable the working members to draw in fresh air from the feeding chute after passing the projection, so that the material will be practically pulled into the machine by the resultant current of air.

It is immaterial for the true nature of the invention what kind of stationary and revolving working members are employed in the machine; whether their activity be principally a thrashing one or a thrashing and straw-reducing one, or merely a straw-reducing one. The subject matter of the patent is, therefore, an axial machine for the treatment of corn-blades, the treatment consisting either in thrashing and straw-reducing, or in either one of these two activities.

With these and other objects in view which will more clearly appear as the specification proceeds, the invention resides, generally stated, in the novel features and devices and combination of features and devices hereinafter described and defined in the claims, the descriptive matter being supplemented by the accompanying drawings in which:

Figure 1:
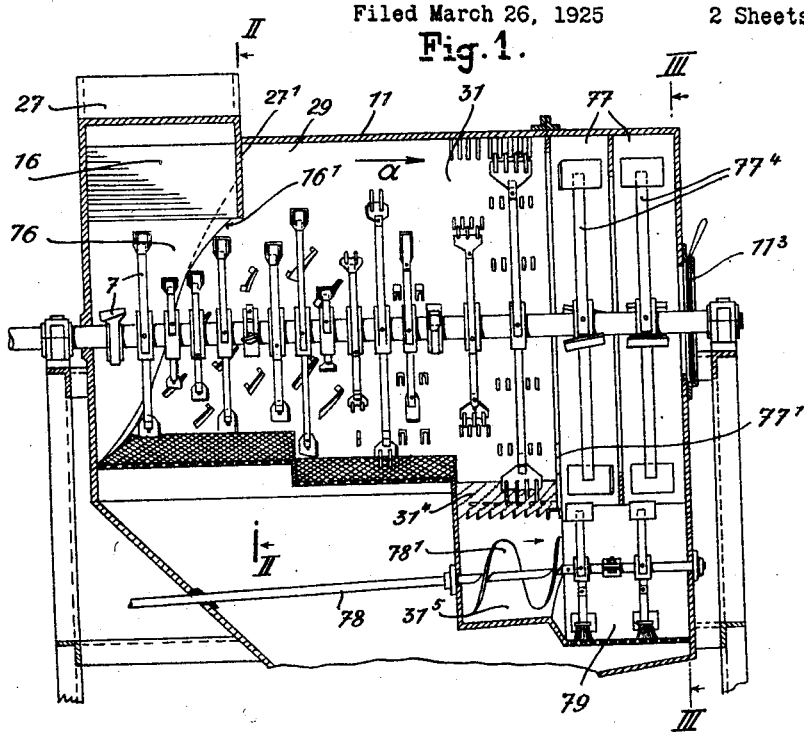
Fig. 1 represents a longitudinal section of a thrashing and straw-reducing machine according to the invention.
Figure 2:
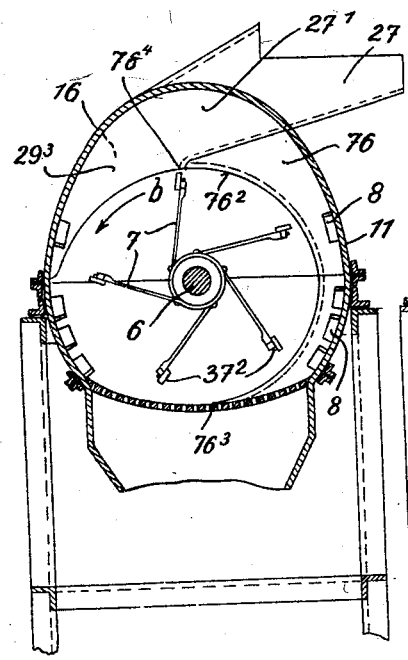
Fig. 2 is a cross-section on the line II—II.
Figure 3:
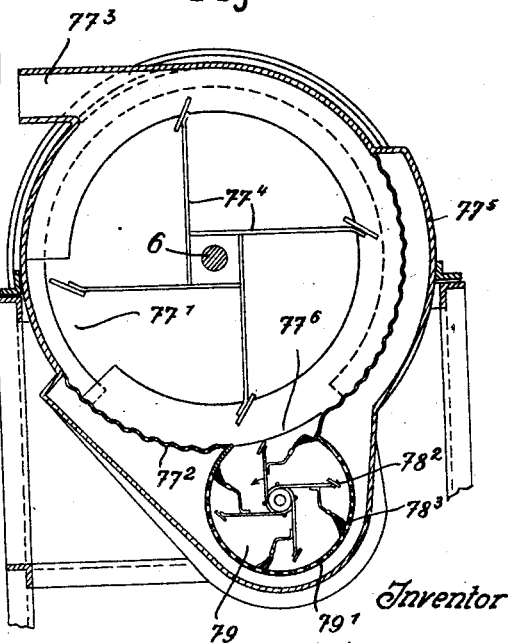
Figure 4:
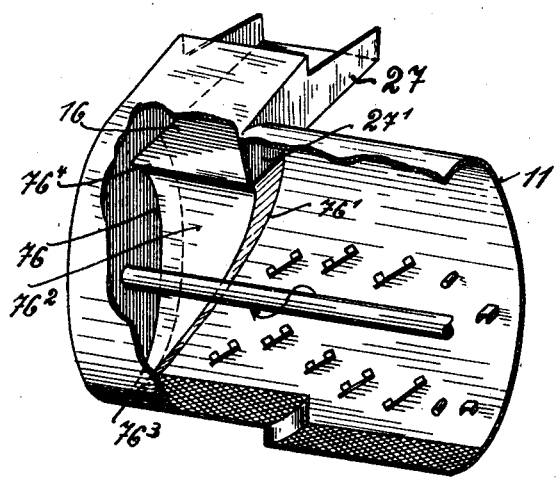
Figure 5:
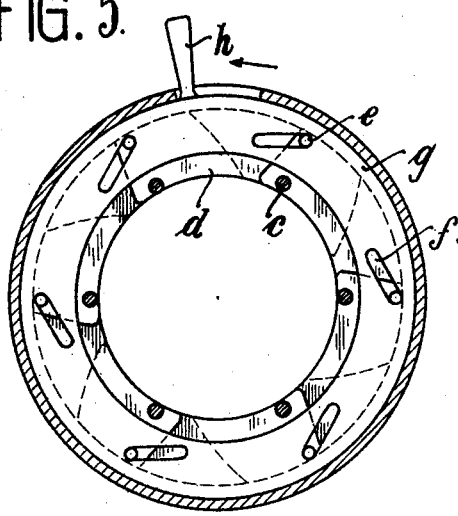
Figure 6:
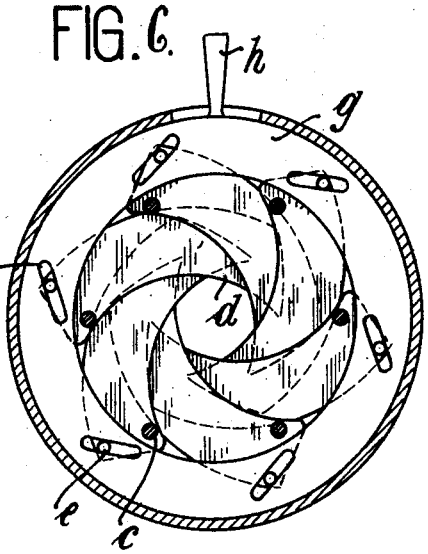

Fig. 3 a cross section on the line III—III of Fig. 1, Fig. 4 is a diagrammatic and perspective view of an interior part of the housing, and Figs. 5 and 6 are detail views on an enlarged scale of the regulating device at the discharge end of the machine, showing two different regulating positions.

At the intake end of the machine, between the rotary working members or beaters 7 and the drum wall 11, a projection or guide element 76 is arranged so as to restrict the space between the beaters and the drum. The guide element, which adjoins the end wall of the drum, is in the particular embodiment herein exhibited wedge-shaped and widens out circumferentially in the rotating direction of the beater shaft 6 marked by the arrow $b$ as well as axially towards the discharge end of the drum, the pointed end $76^3$ of the guide element being preferably situated diametrically opposite the drum inlet 16. The spirally arranged guide surface $76^1$ which faces the discharge end of the machine, is held at right angles to the drum wall 11, and the inner surface $76^2$ which faces the beater shaft 6, approaches the latter spirally in the rotating direction. The abutments or stationary working members 8 whch cooperate with the beaters for thrashing the materials are absent from the guide element.

The far end $76^4$ of the guide element 76, considered in relation to the rotating direction of the beater shaft, is bounded by the bottom of the feeding chute 27 which opens into the machine tangentially to the beater path. The chute 27 is to a great extent entirely enclosed within the side walls and a top and bottom wall so that an air throat is formed which conducts the air tangentially into the drum. The radially extending side wall $27^1$ of the chute which faces the discharge end of the drum, has a prolongation $29^3$ which separates the intake zone of the drum from the working zone. This prolongation of the chute wall is particularly adaptable for use in machines in which the drum 11 is enlarged at the top to form an accumulating pocket 29, as more particularly described in my above named pending application.

The beaters 7 are arranged spirally or helically about the shaft 6 and fitted at their ends with dished shoes $37^2$ which are either rigidly connected to the beaters or adapted for adjustment, the shoes being arranged at a suitable angle relative to the plane of rotation. The beater arms may either be rigid or resilient.

Behind the straw-reducing zone 31 of the machine a grain-separating zone 77 is provided for the utilization of the draught created by the rotation of the beaters. This zone is divided into two compartments, and the radially extending annular plates which divide the compartments from one another and from the straw-reducing zone are interrupted to form gateways $77^1$ through which the material to be treated can proceed in its course through the machine. The lower portion of the wall which surrounds the separating zone is composed of corrugated sieve material as at $77^2$. The end compartment communicates with a tangentially arranged conduit $77^3$ which forms an outlet for the air and for the reduced straw. Beaters $77^4$, connected to the shaft 6 and fitted at their free ends with operating shoes, work in the compartments 77.

Under the compartments 77 a cylindrical sieve drum $79^1$ is arranged which is in communication with said compartments by an opening $77^5$ so as to receive the materials from the same. Within this sieve revolving beaters $78^2$ are arranged, and brushes $78^3$ are connected to the beater arms so as to work behind the beaters against the sieve surface.

Under the straw-reducing zone there is a trough or drum $31^5$ which receives the straw particles and those grains which fall through the bottom grate $31^4$ of said zone. A conveying screw $78^1$, working in the trough $31^5$, feeds the materials from the latter into the working space 79 of the sieve drum $79^1$. A shaft 78 drives the screw $78^1$ as well as the beaters $78^2$ and the brushes $78^3$. The drive of this shaft is derived from the beater or main shaft in a convenient manner.

An aperture is made in the end wall of the machine drum concentrically with the shaft 6. In said aperture is fitted an iris diaphragm $11^3$ which can be adjusted for admitting more or less air into the drum through the aperture. This diaphragm consists of a plurality of lamellæ $d$ having the shape of annular discs which overlap each other and are rotatable transversely of the shape about the stationary bolts or pins $c$. These lamellæ carry pins $e$ which slide inside oblong or enlongated slots $f$ on the circular disc $g$ and this disc can be turned by a hand lever $h$. The slots $f$ are inclined, as indicated, so that when the lever $h$ is moved in the direction of the arrow indicated in Fig. 5 the lamellæ $d$ are radially displaced outwardly, while with the opposite movement of the lever $h$ they are caused to move inwardly. In this manner it is possible to insure an increase or a decrease in size of the slits enclosed between the lamellæ.

When the machine is in operation, the air will be circulated in the drum by the beaters 7 which, owing to their inclination relative to the plane of rotation, also propel the air towards the discharge end of the machine. Air will thus be drawn in through the chute 27, and this tangentially entering air will be deflected by the helical surface $76^1$ of the guide element 76 so as to enhance the propulsion. This effect is augmented by the spiral arrangement of the surface $76^2$ which gradually narrows the space around the beaters in the rotating direction. The wider the surface area of the dished shoes $37^2$, which act like the vanes of a fan, the larger will be the volume of air sucked in through the chute 27, and the materials also will be virtually sucked into the machine. The wall $29^3$ aids in guiding the air current and induces it to pursue a helical course. The materials are carried along by the air current and pass in the direction of the arrow $a$ quickly through the thrashing zone into the straw-reducing zone 31 where the straw is effectively cut up. As the air passes from the zone 31 into the compartments 77, it is caught by the beaters $77^4$ and discharged through the conduit $77^3$. The reduced straw passes from the straw-reducing zone 31 through the gateways $77^1$ into the compartments 77 where it is circulated until it reaches the conduit $77^3$ and is blown out through the latter. While the straw circulates in the compartments 77, the grains mixed with the same will be hurled against the corrugated sieve $77^2$ and either passed through the latter or delivered into the drum $79^1$. The brushes $78^3$ in the latter keep the sieve clean so that the grains received from the compartments 77 as well as from the hopper $37^5$ can pass through. The straw particles which enter the drum $79^1$ are thrown back by the beaters $78^2$ into the compartments 77.

If the iris diaphragm $11^3$ is opened so as to admit air along the shaft, the suction effect in the chute 27 will be reduced, and the propulsion of the materials through the machine will be retarded. In this manner the operation of the machine can be regulated.

The guide element 76 as well as the feeding chute may be arranged in a different position on the drum, and the length of the guide elements may be varied according to requirements. It is understood that the casing including the projection or guide element 76 may assume other specific forms than that illustrated without departing from the principle of the invention and that the gap between the rotary leaders and the surface 76 and the inclination of the edge 76¹ and the axial extent thereof and other dimensions of the radially inwardly projecting part 76 may be varied to suit the particular requirements.

I claim:—

1. In a machine of the character described, a drum having an intake and a discharge end, a rotary shaft axially extending within said drum, rotary working members mounted on said shaft, stationary working members, and a projection at the intake arranged inside said drum between the outer ends of the rotary working members and the drum wall, said projection being adapted to restrict the space around the rotary working members at points circumferentially in advance of the intake.

2. In a thrashing and straw-reducing machine comprising a drum having an intake and a discharge end, a rotary shaft axially extending within said drum, rotary working members mounted on said shaft, stationary working members, and a projection adjoining the intake end wall of said drum and widening out uniformly towards the discharge end of the machine as well as in the rotating direction of the shaft.

3. In a thrashing and straw-reducing machine comprising a drum having an intake and a discharge end, a rotary shaft axially extending within said drum, rotary working members mounted on said shaft, stationary working members, and a projection arranged in said drum at the intake end of the machine, and having a part adapted to restrict the space around said rotary working members, that wall of said projection which faces the rotary shaft being thus formed as to spirally approach to said shaft.

4. In a thrashing and straw-reducing machine comprising a drum having an intake and a discharge end, a rotary shaft axially extending within said drum, rotary working members mounted on said shaft, stationary working members, and a projection arranged in said drum at the intake end of the machine, and having a part adapted to restrict the space around said rotary working members, that wall of said projection which faces the discharge end of the machine being helically formed.

5. In a thrashing and straw-reducing machine comprising a drum having an intake and a discharge end, a rotary shaft axially extending within said drum, rotary working members mounted on said shaft, stationary working members, and a projection arranged in said drum at the intake end of the machine, and having a part adapted to restrict the space around said rotary working members, that wall of said projection which faces the discharge end of the machine being helically formed and being arranged at right angles to the surrounding part of the drum wall.

6. In a thrashing and straw-reducing machine comprising a drum having an intake and a discharge end, a feeding hopper near said intake end, a rotary shaft axially extending within said drum, rotary working members mounted on said shaft, stationary working members, and a projection arranged in said drum at the intake end of the machine, and having a part adapted to restrict the space around said rotary working members, that wall of said projection which faces the discharge end of the machine being continued from a point adjacent the end wall of said drum to that edge of said feeding hopper which faces the discharge end.

7. In a thrashing and straw-reducing machine comprising a drum having an intake and a discharge end, a feeding hopper having side walls and a bottom part, a rotary shaft axially extending within said drum, rotary working members mounted on said shaft, stationary working members, and a projection arranged in said drum at the intake end of the machine and disposed circumferentially in advance thereof, the end of said projection which extends in the rotary direction of the working members being terminated at the feeding hopper.

8. A machine of the character set forth in claim 7 wherein the feeding hopper is tangentially disposed.

9. In a machine of the character set forth in claim 7 wherein the feeding hopper is tangentially disposed and includes a top wall whereby a considerable portion of the feeding hopper is entirely enclosed between the side walls and the top wall.

10. A machine of the character set forth in claim 6 having a radial wall which forms a prolongation of that side of the feeding hopper which faces the discharge end of the machine and which separates the intake from the axially adjacent part of the machine.

11. A machine of the character set forth in claim 1 including a conduit connected to the discharge end portion of said drum and adapted to receive and discharge the air current developed by the rotary members and the projection together with the reduced material worked upon.

12. An axial thrashing and straw-reducing machine including a housing, rotary beaters and stationary cooperating working members and a stationary circumferentially disposed part partly surrounding the rotary members at the intake end, said part having a contour which approaches and restricts the space about the rotating working members in the direction of rotation and at points circumferentially in advance of the intake.

13. An axial thrashing or straw reducing machine including a drum surrounding a shaft and rotating working members carried thereby, said rotating members being arranged to induce a draft axially of the machine and said drum having an interior contour at the inlet end restricting the space about the rotary working members at points circumferentially in advance of the inlet so as to cooperate and function with the rotating working members at the intake end to set up a strong draft in the axial direction.

14. In an axial thrashing or straw-reducing machine, a rotary shaft, a housing of elongated form surrounding said shaft and having at one end an inlet opening and at the opposite end a discharge opening, a plurality of rotary beaters carried by said shaft and a plurality of stationary members carried by the housing and cooperatively functioning with said rotary beaters to work upon and feed the material axially toward the discharge end, the intake end of said machine being formed into a combined material feeding and draft producing part including rotary beaters and casing part which function as a blower.

15. In a machine of the character described a drum having an intake and a discharge end, a rotary shaft axially extending within said drum, rotary working members mounted on said shaft, a radially inward projection adjoining the intake end wall of said drum and restricting the chamber about the rotating members at a point in advance of the intake and stationary working members carried by the drum intermediate said projection and the discharge end.

In testimony whereof I have signed my name to this specification.

FELIX SCHLAYER.